United States Patent
Kim et al.

(10) Patent No.: US 8,253,733 B2
(45) Date of Patent: Aug. 28, 2012

(54) 3D IMAGE GENERATION APPARATUS AND METHOD

(75) Inventors: Ji Won Kim, Seoul (KR); Yong Ju Jung, Daejeon-si (KR); Aron Baik, Yongin-si (KR); Du-Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 532 days.

(21) Appl. No.: 12/402,732

(22) Filed: Mar. 12, 2009

(65) Prior Publication Data

US 2010/0110070 A1    May 6, 2010

(30) Foreign Application Priority Data

Nov. 6, 2008 (KR) .................. 10-2008-0109930

(51) Int. Cl.
 G06T 15/00 (2011.01)
 G06K 9/32 (2006.01)
 G06F 17/17 (2006.01)
(52) U.S. Cl. .................. 345/419; 382/299; 708/313
(58) Field of Classification Search .................. None
See application file for complete search history.

(56) References Cited

U.S. PATENT DOCUMENTS

| | | | |
|---|---|---|---|
| 7,889,949 B2 * | 2/2011 | Cohen et al. | 382/299 |
| 2006/0044388 A1 * | 3/2006 | Kim et al. | 348/42 |
| 2006/0256188 A1 * | 11/2006 | Mock et al. | 348/14.09 |
| 2008/0252638 A1 * | 10/2008 | Riemens et al. | 345/419 |
| 2009/0179920 A1 * | 7/2009 | Riemens et al. | 345/660 |
| 2010/0002948 A1 * | 1/2010 | Gangwal et al. | 382/254 |

FOREIGN PATENT DOCUMENTS

| | | |
|---|---|---|
| KR | 10-2005-0058085 | 6/2005 |
| KR | 10-2005-0092122 | 9/2005 |
| KR | 10-2006-0041060 | 5/2006 |
| KR | 10-2006-0067238 | 6/2006 |

OTHER PUBLICATIONS

Qingxiong Yang; Ruigang Yang; Davis, J.; Nister, D.; , "Spatial-Depth Super Resolution for Range Images," Computer Vision and Pattern Recognition, 2007. CVPR '07. IEEE Conference on, vol., No., pp. 1-8, Jun. 17-22, 2007.*

Tomasi, C.; Manduchi, R., "Bilateral filtering for gray and color images," Computer Vision, 1998. Sixth International Conference on, vol., No., pp. 839-846, Jan. 4-7, 1998.*

Philips 3D Solutions, "3D Interface Specifications, White Paper," Feb. 15, 2008.*

Kuk-Jin Yoon; In So Kweon;, "Adaptive support-weight approach for correspondence search," Pattern Analysis and Machine Intelligence, IEEE Transactions on, vol. 28, No. 4, pp. 650-656, Apr. 2006.*

* cited by examiner

Primary Examiner — Kee M Tung
Assistant Examiner — Zhengxi Liu
(74) Attorney, Agent, or Firm — Staas & Halsey LLP

(57) ABSTRACT

A three-dimensional (3D) image generator and 3D image generation method scale a depth map or a two-dimensional (2D) image, perform a cross filtering to sharpen a blurred region on the depth map based on location information of the depth map and 2D image, and thus obtain a clearer depth map and provide a more graphical 3D image using the depth map.

20 Claims, 4 Drawing Sheets

3D IMAGE GENERATION APPARATUS AND METHOD

CROSS-REFERENCE TO RELATED APPLICATIONS

This application claims the benefit of Korean Patent Application No. 10-2008-0109930, filed on Nov. 6, 2008, in the Korean Intellectual Property Office, the disclosure of which is incorporated herein by reference.

BACKGROUND

1. Field

Example embodiments relate to a three-dimensional (3D) image generation apparatus and method.

2. Description of the Related Art

Currently, users may be provided with a more graphical three-dimensional (3D) image due to the development of a 3D display apparatus. An amount of 3D contents increases and a resolution of an environment where contents is produced becomes varied.

3D displays are required to support various sizes of contents from a National Television System Committee (NTSC) format of 720×480 to a High Definition (HD) resolution of 1920×1080. Also, 3D displays are to support an image scaling for an effect of depth.

In conventional art, a general 3D video scaler supporting a variety of 3D input formats does not exist. Accordingly, a well-known 2D video scaler has been used.

SUMMARY

Example embodiments may provide a three-dimensional (3D) image generator and 3D image generation method which scales a depth map or a two-dimensional (2D) image, performs a cross filtering to sharpen a blurred region on the depth map based on location information of the depth map and the 2D image, and thus obtain a clearer depth map and provide a more graphical 3D image using the depth map. Sharpening a blurred image refers to making an image more distinct and resolving the image to make it clearer.

Example embodiments also provide a 3D contents generation algorithm enabling an improved 3D image to be obtained using a clear depth map, and thus provide a viewer with an improved viewing environment through a variety of displays such as a television (TV), monitor, and the like.

According to example embodiments, a method of generating a 3D image using a first 2D image and a second 2D image includes: upscaling the first 2D image and the second 2D image; and performing at least one of a filtering to sharpen the second 2D image using the first 2D image and a filtering to sharpen the first 2D image using the second 2D image.

Either one of the first 2D image and the second 2D image may be a depth map including information about a 3D effect of the 3D image.

The upscaling may include: concatenating the first 2D image with the second 2D image; upscaling the concatenated first 2D image and second 2D image; and separating the first 2D image from the second 2D image.

The concatenating may concatenate a side of the first 2D image with a side of the second 2D image.

The concatenating may divide the first 2D image and the second 2D image by a predetermined region and combine the divided regions to concatenate.

When the second 2D image is the depth map, the filtering to sharpen the second 2D image may control a depth value in a region of the depth map to be a predetermined depth value, the region of the depth map may correspond to a similar feature region on the first 2D image, and the similar feature region may be a region wherein a feature information value is within a predetermined range value.

When the second 2D image is the depth map, the filtering to sharpen the first 2D image may control a feature information value in a region of the first 2D image to be a predetermined feature information value, the region of the first 2D image may correspond to a similar depth value region on the depth map, and the similar depth value region may be a region wherein a depth value is within a predetermined range value.

The feature information value may be an information value associated with a luminance or a Red, Green, Blue (RGB) value.

The performing may use a Cross Bilateral Filter (CBF) which sharpens a line element corresponding to an edge or contour of an image and controls regions having similar region values in the image as a same region value, to perform the at least one of the filtering to sharpen the second 2D image using the first 2D image and the filtering to sharpen the first 2D image using the second 2D image.

According to example embodiments, a 3D image generator generates a 3D image using a first 2D image and a second 2D image, the 3D image generator including: an image scaler to upscale the first 2D image and the second 2D image; and a filter to perform at least one of: a filtering to sharpen the second 2D image using the first 2D image and a filtering to sharpen the first 2D image using the second 2D image.

Any one of the first 2D image and the second 2D image may be a depth map including information about a 3D effect of the 3D image.

The 3D image generator may further include: a concatenator to concatenate the first 2D image with the second 2D image; and a separator to separate the first 2D image from the second 2D image.

The concatenator may concatenate a side of the first 2D image with a side of the second 2D image.

The concatenator may divide the first 2D image and the second 2D image by a predetermined region and combine the divided regions to concatenate.

When the second 2D image is the depth map, the filter may control a depth value in a region of the depth map to be a predetermined depth value, the region of the depth map may correspond to a similar feature region on the first 2D image, and the similar feature region may be a region where a feature information value is within a predetermined range value.

When the second 2D image is the depth map, the filter may control a feature information value in a region of the first 2D image to be a predetermined feature information value, the region of the first 2D image may correspond to a similar depth value region on the depth map, and the similar depth value region may be a region where a depth value is within a predetermined range value.

The feature information value may be an information value associated with a luminance or an RGB value.

The filter may include a CBF which sharpens a line element corresponding to an edge or contour of an image and controls regions having similar region values in the image as a same region value, to perform the at least one of the filtering to sharpen the second 2D image using the first 2D image and the filtering to sharpen the first 2D image using the second 2D image.

The image scaler may include: a first image scaler to upscale the first 2D image; and a second image scaler to upscale the second 2D image.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects, features, and advantages of example embodiments will become apparent and more readily appreciated from the following description, taken in conjunction with the accompanying drawings of which.

DETAILED DESCRIPTION OF EMBODIMENTS

Figure 1:
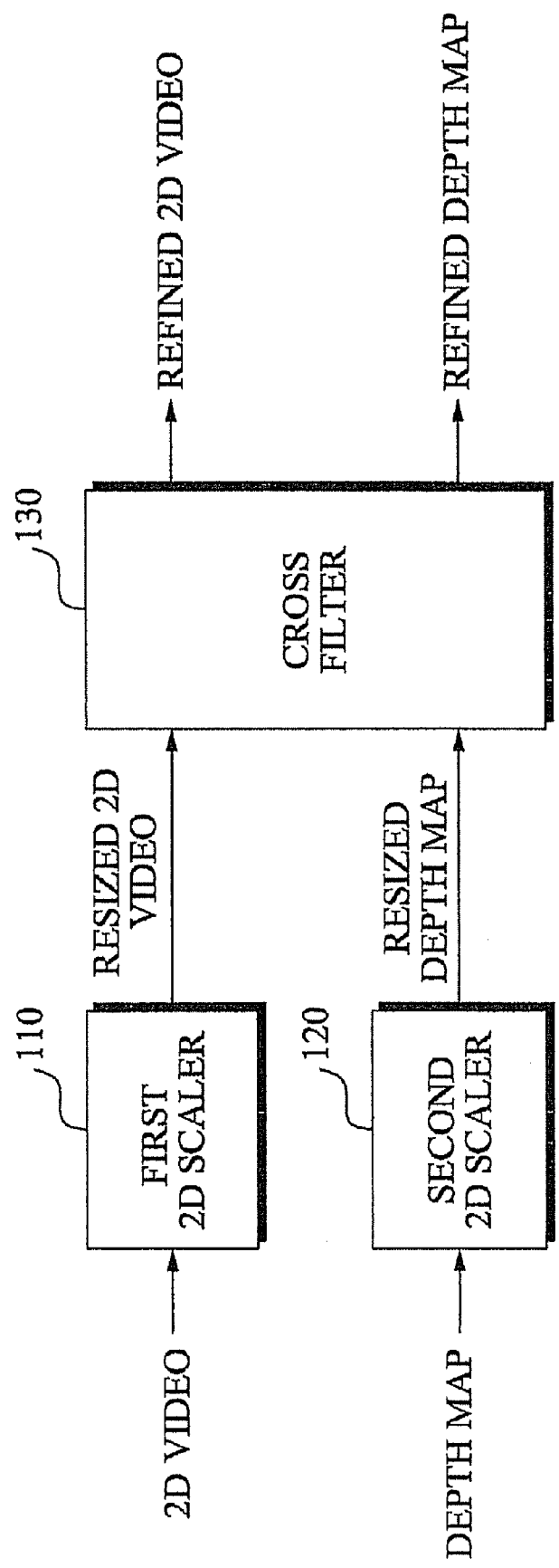
FIG. 1 is a block diagram illustrating a three-dimensional (3D) image generator according to an example embodiment.

Reference will now be made in detail to embodiments, examples of which are illustrated in the accompanying drawings, wherein like reference numerals refer to the like elements throughout. The embodiments are described below to explain the present disclosure by referring to the figures.

FIG. 1 is a block diagram illustrating a three-dimensional (3D) image generation apparatus according to an example embodiment. The 3D image generator according to the example embodiment is described in detail with reference to FIG. 1.

As illustrated in FIG. 1, the 3D image generator may include image a first scaler 110, a second scaler 120, and a cross filter 130.

The 3D image generator may generate a 3D image using at least two 2D images.

The first and second image scalers 110 and 120 may upscale the at least two 2D images. According to the example embodiment, the image scalers 110 and 120 may include a first 2D scaler 110 and a second 2D scaler 120.

The first 2D scaler 110 and the second 2D scaler 120 may upscale received 2D images, respectively.

Any one of the 2D images received in the first 2D scaler 110 and the second 2D scaler 120 may be a depth map including information about a 3D effect of the 3D image.

As illustrated in FIG. 1, in one embodiment, a 2D video may be received in the first 2D scaler 110, and a depth map may be received in the second 2D scaler 120.

Accordingly, the first 2D scaler 110 may upscale the 2D video, and the second 2D scaler 120 may upscale the depth map.

Also, the 3D image generator may process various received images as well as the 2D video and the depth map. For example, the first 2D scaler 110 may upscale using a left eye image instead of the 2D video, and the second 2D scaler 120 may upscale using a right eye image instead of the depth map.

The filter 130 may perform filtering to sharpen the second 2D image using the first 2D image received from the first 2D scaler 110. Also, the filter 130 may perform filtering to sharpen the first 2D image using the second 2D image received from the second 2D scaler 120.

For example, when the first 2D image is the 2D video used for the 3D image, and the second 2D image is the depth map, the filter 130 may perform filtering to sharpen the depth map using the 2D video from the first 2D scaler, that is, the first 2D image. Also, the filter 130 may perform filtering to sharpen the 2D video from the first 2D scaler using the depth map from the second 2D scaler.

Specifically, when the second 2D image is the depth map, the filter 130 may retrieve a similar feature region on the 2D video, and retrieve a region, corresponding to the similar feature region, on the depth map. Also, the filter 130 may control a depth value of the region of the depth map to be a predetermined depth value. That is, the filter 130 may control the region corresponding to the similar feature region on the 2D video, to have similar depth values.

Also, when the second 2D image is the depth map, the filter 130 may retrieve a region, corresponding to a similar depth value region on the depth map, on the first 2D image. Also, the filter 130 may control a feature information value of the retrieved region to be a predetermined feature information value. In this instance, the similar depth value region may indicate a region where a depth value is within a predetermined range value.

That is, the filter 130 may sharpen the 2D video which is the first 2D image using the depth map.

The similar feature region may indicate a region where a feature information value is within a predetermined range value. Also, the feature information value may be an information value associated with a luminance or a Red, Green, Blue (RGB) value.

Also, a Cross Bilateral Filter (CBF) may be used as the filter 130. The CBF may sharpen a line element corresponding to an edge or contour of an image, and control regions having similar region values in an image as a same region value.

According to example embodiments, a blurred region on the depth map may be sharpened by filtering, and a clearer depth map may be obtained. Thus, a more graphical 3D image may be provided through a cross-filtering based on location information of the 2D video and the depth map, which is different from a method of separately scaling the 2D video and the depth map.

Figure 2:
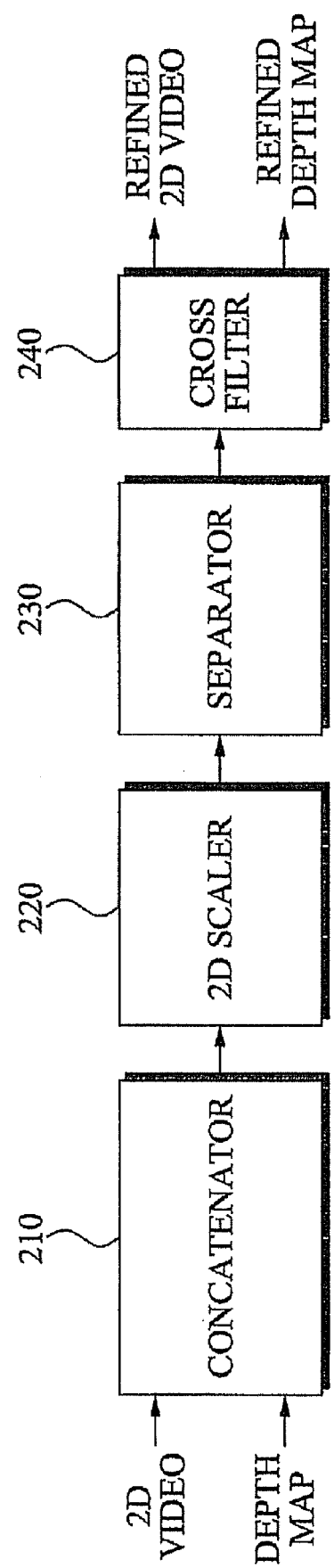
FIG. 2 is a block diagram illustrating a 3D image generator according to another example embodiment.

FIG. 2 is a block diagram illustrating a 3D image generator according to another example embodiment. The 3D image generator according to the example embodiment is described in detail with reference to FIG. 2.

As is illustrated in FIG. 2, the 3D image generator according to an example embodiment may include a concatenator 210, a 2D scaler 220, a separator 230, and a cross filter 240.

The concatenator 210 may concatenate a received first 2D image with a received second 2D image.

When the first 2D image and the second 2D image are concatenated by the concatenator 210, the single 2D scaler 220, as opposed to two 2D scalers, may be used to upscale the first 2D image and the second 2D image.

When the concatenator 210 concatenates the first 2D image with the second 2D image, a side of the first 2D image may be concatenated with a side of the second 2D image. Specifically, a longitudinal side of the first 2D image may be concatenated with a longitudinal side of the second 2D image side by side, or a lateral side of the first 2D image may be concatenated with a lateral side of the second 2D image up and down.

That is, when the concatenator 210 concatenates the longitudinal side of the first 2D image with the longitudinal side of the second 2D image, an image generated by the concatenating may have a same length as the first 2D image or the second 2D image. However, a width of the image may be twice as wide as the first 2D image or the second 2D image.

Also, the concatenator 210 may divide the first 2D image and the second 2D image by a predetermined region and combine the divided regions to concatenate. Accordingly, the concatenator 210 may generate a checkerboard image. The first 2D image and the second 2D image may be concatenated through a variety of image concatenation methods.

The 2D scaler 220 may upscale the concatenated first 2D image and second 2D image.

The separator 230 may separate the first 2D image from the second 2D image.

The filter 240 may perform filtering to sharpen the first 2D image and the second 2D image.

Specifically, the filter 240 may perform at least one of a filtering to sharpen the second 2D image using the first 2D image and a filtering to sharpen the first 2D image using the second 2D image.

That is, the second 2D image may be sharpened using the first 2D image, or the first 2D image may be sharpened using the second 2D image. Also, the filtering to sharpen the second 2D image using the first 2D image and the filtering to sharpen the first 2D image using the second 2D image may be simultaneously performed.

For example, when the second 2D image is the depth map, the filter 240 may control a depth value in a region of the depth map to be a predetermined depth value. In this instance, the region of the depth map may correspond to a similar feature region on the first 2D image. The depth map may include information about a 3D effect of a 3D image, and the similar feature region may be a region where a feature information value is within a predetermined range value. Also, the similar feature region may indicate a region having a similar feature value such as an RGB value or a luminance value.

That is, the filter 240 may control the region, matched with the similar feature region on the second 2D image, on the depth to have a predetermined similar depth value.

Also, a CBF may be used as the filter 240. The CBF may sharpen a line element corresponding to an edge or contour of an image, and control regions having similar region values in an image as a same region value.

Figure 3:
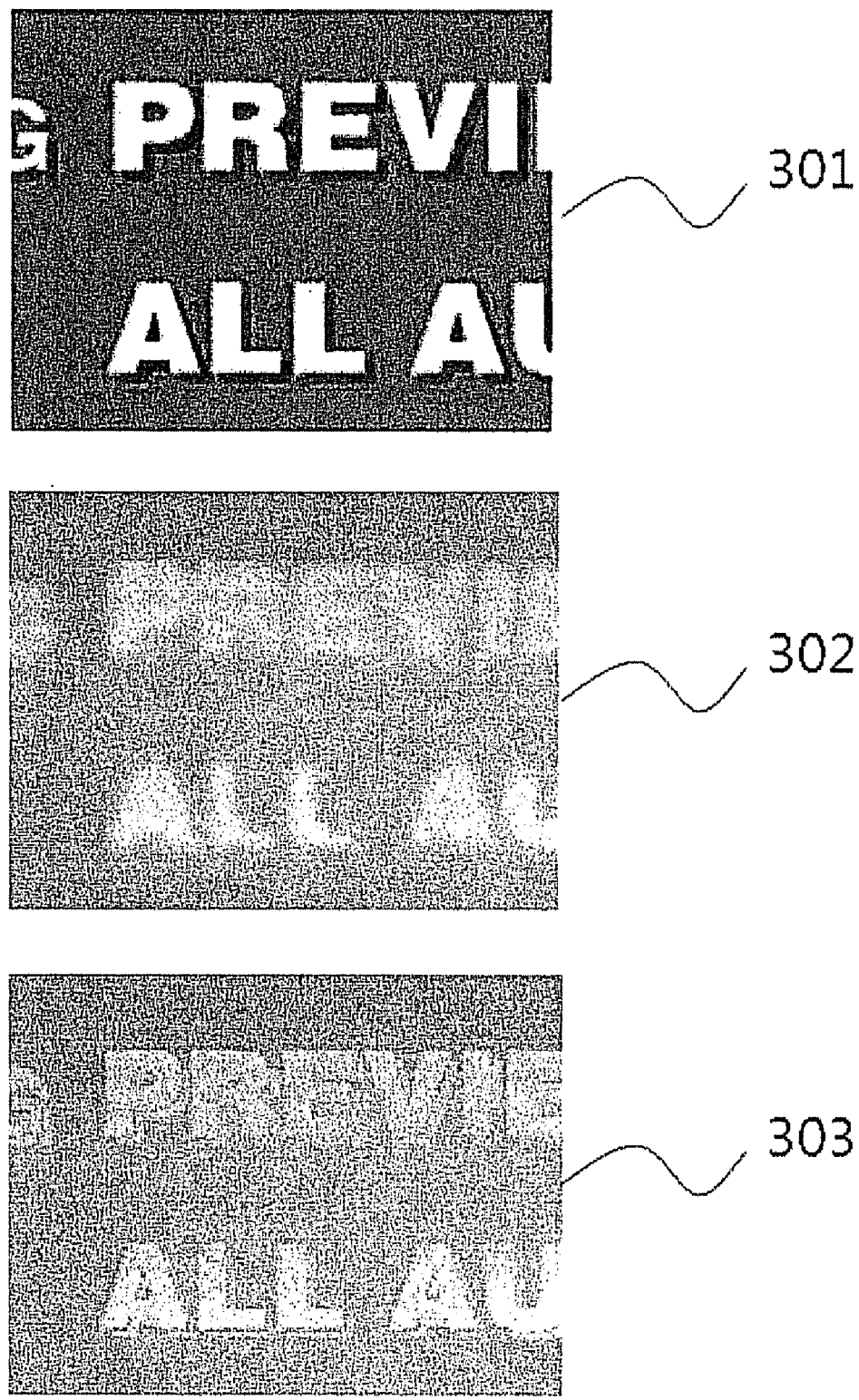
FIG. 3 is a diagram illustrating an example of an image scaling according to an example embodiment.

FIG. 3 is a diagram illustrating an example of image scaling according to an example embodiment. FIG. 3 illustrates an enlarged first 2D image 310 according to an example embodiment, an enlarged depth map 320 in a conventional art, and an enlarged depth map 330 according to an example embodiment.

In the enlarged depth map 320 in conventional art, spatial distortion may be generated due to errors occurring in scaling when displaying a 3D image on a display.

In a multi-view 3D image, a range of a viewing angle is wide. Accordingly, when generating a 3D image using a depth map where an error is generated, the error may be accumulated, and thus, a visually-distorted 3D image may be generated.

According to an example embodiment, a more accurate enlarged depth map 330 may be generated using the enlarged first 2D image 310.

Specifically, a filter according to an example embodiment may filter to sharpen a blurred region in regions corresponding to an edge or contour of the depth map, using color information of a first 2D image.

Thus, according to example embodiments, when an alignment accuracy between a first 2D image and a depth map is improved, a clearer 3D image may be obtained.

Figure 4:
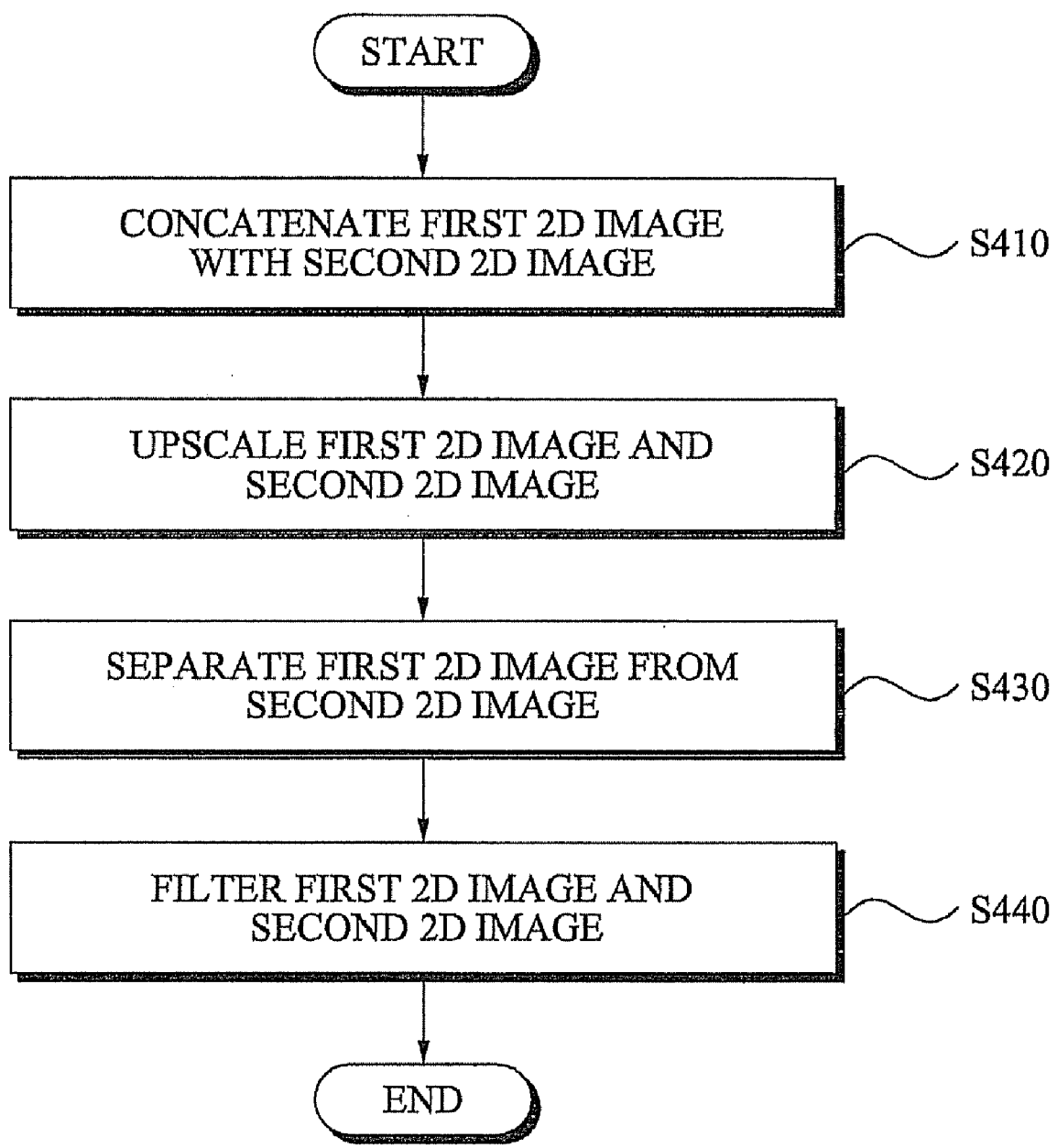
FIG. 4 is a flowchart illustrating a method of generating a 3D image according to an example embodiment.

FIG. 4 is a flowchart illustrating a method of generating a 3D image according to example embodiments. The method of generating a 3D image is described in detail with reference to FIG. 4.

In operation S410, a concatenator may concatenate a received first 2D image with a received second 2D image.

As described above, when the first 2D image and the second 2D image are concatenated by the concatenator, a single scaler as opposed to two scalers may upscale the first 2D image and the second 2D image.

In this instance, the concatenator may concatenate a side of the first 2D image with a side of the second 2D image. Specifically, a longitudinal side of the first 2D image may be concatenated with a longitudinal side of the second 2D image side by side, or a lateral side of the first 2D image may be concatenated with a lateral side of the second 2D image up and down.

Also, the concatenator may divide the first 2D image and the second 2D image by a predetermined region and combine the divided regions to concatenate. Accordingly, the concatenator may generate a checkerboard image. The first 2D image and the second 2D image may be concatenated by a variety of image concatenation methods.

In operation S420, the scaler may upscale the first 2D image and the second 2D image.

In operation S430, a separator may separate the first 2D image from the second 2D image.

In operation S440, a filter may filter to sharpen the first 2D image and the second 2D image.

In this instance, the filter may perform at least one of: a filtering to sharpen the second 2D image using the first 2D image and a filtering to sharpen the first 2D image using the second 2D image.

Specifically, the second 2D image may be sharpened using the first 2D image, or the first 2D image may be sharpened using the second 2D image. Also, the filtering to sharpen the second 2D image using the first 2D image and the filtering to sharpen the first 2D image using the second 2D image may be simultaneously performed.

Accordingly, a 3D contents generation algorithm enabling an improved 3D image to be obtained using a clear depth map may be provided, and thus, a viewer may be provided with an improved viewing environment through a variety of displays such as a television (TV), a monitor, or the like.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. A method of generating a three-dimensional (3D) image using a first two-dimensional (2D) image and a second 2D image, the method comprising:

upscaling the first 2D image and the second 2D image; and performing, simultaneously, a cross filtering to sharpen the second 2D image using the first 2D image and a cross filtering to sharpen the first 2D image using the second 2D image.

2. The method of claim 1, wherein one of the first 2D image and the second 2D image is a depth map including information about a 3D effect of the 3D image.

3. The method of claim 1, wherein the upscaling comprises:

concatenating the first 2D image with the second 2D image;

upscaling the concatenated first 2D image and second 2D image; and separating the first 2D image from the second 2D image.

4. The method of claim 3, wherein the concatenating concatenates a side of the first 2D image with a side of the second 2D image.

5. The method of claim 3, wherein the concatenating divides the first 2D image and the second 2D image by a predetermined region and combines the divided regions to concatenate.

6. The method of claim 1, wherein, when the second 2D image is the depth map, the filtering to sharpen the second 2D image controls a depth value in a region of the depth map to be a predetermined depth value, the region of the depth map corresponds to a similar feature region on the first 2D image, and the similar feature region is a region wherein a feature information value is within a predetermined range value.

7. The method of claim 1, wherein, when the second 2D image is a depth map, the filtering to sharpen the first 2D image controls a feature information value in a region of the first 2D image to be a predetermined feature information value, the region of the first 2D image corresponds to a similar depth value region on the depth map, and the similar depth value region is a region wherein a depth value is within a predetermined range value.

8. The method of claim 6, wherein the feature information value is an information value associated with a luminance or a Red, Green, Blue (RGB) value.

9. The method of claim 1, wherein the performing uses a Cross Bilateral Filter (CBF) which sharpens a line element corresponding to an edge or contour of an image and controls regions having similar region values in the image as a same region value, to perform the at least one of: the filtering to sharpen the second 2D image using the first 2D image and the filtering to sharpen the first 2D image using the second 2D image.

10. A three-dimensional (3D) image generator generating a 3D image using a first two-dimensional (2D) image and a second 2D image, the 3D image generator comprising:

an image scaler to upscale the first 2D image and the second 2D image; and a filter to perform, simultaneously, a cross filtering to sharpen the second 2D image using the first 2D image and a cross filtering to sharpen the first 2D image using the second 2D image.

11. The 3D image generator of claim 10, wherein one of the first 2D image and the second 2D image is a depth map including information about a 3D effect of the 3D image.

12. The 3D image generator of claim 10, further comprising:

a concatenator to concatenate the first 2D image with the second 2D image; and a separator to separate the first 2D image from the second 2D image.

13. The 3D image generator of claim 12, wherein the concatenator concatenates a side of the first 2D image with a side of the second 2D image.

14. The 3D image generator of claim 12, wherein the concatenator divides the first 2D image and the second 2D image by a predetermined region and combines the divided regions to concatenate.

15. The 3D image generator of claim 10, wherein, when the second 2D image is a depth map, the filter controls a depth value in a region of the depth map to be a predetermined depth value, the region of the depth map corresponds to a similar feature region on the first 2D image, and the similar feature region is a region where a feature information value is within a predetermined range value.

16. The 3D image generator of claim 10, wherein, when the second 2D image is the depth map, the filter controls a feature information value in a region of the first 2D image to be a predetermined feature information value, the region of the first 2D image corresponds to a similar depth value region on the depth map, and the similar depth value region is a region wherein a depth value is within a predetermined range value.

17. The 3D image generator of claim 15, wherein the feature information value is an information value associated with a luminance or a Red, Green, Blue (RGB) value.

18. The 3D image generator of claim 10, wherein the filter includes a CBF which sharpens a line element corresponding to an edge or contour of an image and controls regions having similar region values in the image as a same region value, to perform the at least one of: the filtering to sharpen the second 2D image using the first 2D image and the filtering to sharpen the first 2D image using the second 2D image.

19. The 3D image generator of claim 10, wherein the image scaler comprises:

a first image scaler to upscale the first 2D image; and a second image scaler to upscale the second 2D image.

20. A three-dimensional (3D) image generator generating a 3D image using a first predetermined image and a second predetermined image, the 3D image generator comprising:

an image scaler to upscale the first predetermined image and the second predetermined image; and a filter to perform, simultaneously, a cross filtering to sharpen the second predetermined image using the first predetermined image and a cross filtering to sharpen the first predetermined image using the second predetermined image.

* * * * *